US012689165B2

(12) United States Patent
Daoust et al.

(10) Patent No.: US 12,689,165 B2
(45) Date of Patent: Jul. 21, 2026

(54) PUSH/PULL INTERFACE FOR COAXIAL CABLES WITH SECURE GROUND CONNECTION

(71) Applicant: PPC BROADBAND, INC., East Syracuse, NY (US)

(72) Inventors: Daniel Daoust, Syracuse, NY (US); Noah Montena, Syracuse, NY (US); Eric Purdy, Constantia, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 372 days.

(21) Appl. No.: 18/215,285

(22) Filed: Jun. 28, 2023

(65) Prior Publication Data

US 2023/0420894 A1 Dec. 28, 2023

Related U.S. Application Data

(60) Provisional application No. 63/367,137, filed on Jun. 28, 2022, provisional application No. 63/356,096, filed on Jun. 28, 2022.

(51) Int. Cl.
*H01R 24/54* (2011.01)
*H01R 103/00* (2006.01)

(52) U.S. Cl.
CPC ....... *H01R 24/542* (2013.01); *H01R 2103/00* (2013.01)

(58) Field of Classification Search
CPC ...... H01R 24/542; H01R 24/38; H01R 24/25; H01R 9/05

(Continued)

(56) References Cited

U.S. PATENT DOCUMENTS 6,835,095 B2 * 12/2004 Chen ........................ H01R 9/05 439/700
7,128,604 B2 * 10/2006 Hall ..................... H01R 24/542 439/485

(Continued)

FOREIGN PATENT DOCUMENTS

| | | | |
|---|---|---|---|
| EP | 3742561 | A1 | 11/2020 |
| TW | 201106556 | A | 2/2011 |
| WO | 2022049128 | A1 | 3/2022 |

OTHER PUBLICATIONS

International Search Report and Written Opinion dated Oct. 9, 2023 in corresponding International Application No. PCT/US2023/026400, 12 pages.

*Primary Examiner* — Hae Moon Hyeon
(74) *Attorney, Agent, or Firm* — MH2 TECHNOLOGY LAW GROUP LLP

(57) ABSTRACT

A cable connector assembly that may include a connector that may comprise a first body and a second body that may be configured to be coupled to the first body, and an adapter comprising a biasing portion. The biasing portion may be configured to be coupled to the second body. The biasing portion may be configured to have a space that is configured to allow the biasing portion to elastically deform radially inwardly. The biasing portion may be configured to exert an axial biasing force axially against the second body. The biasing portion may be configured to exert an outward radial biasing force against the second body. The biasing portion may be configured to provide the axial and radial biasing forces so as to provide a secure ground connection between the connector and the adapter and such that a push/pull connection between the connector and the adapter that is operable by a non-technician user.

41 Claims, 12 Drawing Sheets

(58) Field of Classification Search
USPC .................................. 439/578, 256, 253, 638
See application file for complete search history.

(56) References Cited

U.S. PATENT DOCUMENTS

| | | | | |
|---|---|---|---|---|
| 8,221,161 | B2 * | 7/2012 | Leibfried, Jr. ....... | H01R 24/542<br>439/578 |
| 9,106,035 | B2 * | 8/2015 | Erdos ................... | H01R 24/542 |
| 9,112,323 | B2 | 8/2015 | Goebel et al. | |
| 9,444,197 | B2 | 9/2016 | Goebel et al. | |
| 9,762,007 | B2 * | 9/2017 | Erdos ................. | H01R 13/6277 |
| 2013/0100571 | A1 * | 4/2013 | Alkan ....................... | H01T 4/10<br>29/869 |
| 2013/0244481 | A1 | 9/2013 | Holland et al. | |
| 2013/0244509 | A1 | 9/2013 | Holland | |
| 2015/0038009 | A1 | 2/2015 | Gibson et al. | |
| 2017/0201047 | A1 | 7/2017 | Hanson et al. | |
| 2020/0335916 | A1 | 10/2020 | Hanson et al. | |
| 2020/0358232 | A1 * | 11/2020 | Watkins ............. | H01R 13/6583 |
| 2021/0210891 | A1 * | 7/2021 | Purdy .................. | H01R 13/426 |
| 2021/0399506 | A1 * | 12/2021 | Blasick .................. | H01R 43/20 |
| 2022/0085549 | A1 * | 3/2022 | Volkov ................... | H01R 24/50 |
| 2022/0393411 | A1 * | 12/2022 | Asano .................. | H01R 24/542 |
| 2023/0187868 | A1 * | 6/2023 | Purdy .................. | H01R 9/0524<br>439/578 |
| 2023/0216221 | A1 * | 7/2023 | Purdy .................. | H01R 9/0527<br>439/578 |
| 2023/0216257 | A1 * | 7/2023 | Daoust ............... | H01R 13/2464<br>439/346 |
| 2024/0339792 | A1 * | 10/2024 | Chen ...................... | H01R 24/50 |

* cited by examiner

PUSH/PULL INTERFACE FOR COAXIAL CABLES WITH SECURE GROUND CONNECTION

CROSS-REFERENCE TO RELATED APPLICATION

This application claims the benefit of U.S. Provisional Application No. 63/367,137, which was filed on Jun. 28, 2022, and U.S. Provisional Application No. 63/356,096, which was filed on Jun. 28, 2022, the disclosures of which are hereby incorporated by reference herein in their entirety.

BACKGROUND

The present invention relates generally to interfaces for coaxial cable connections. More particularly, the present invention relates to an interface for a connector (for example, an axially compressible connector, for a coaxial cable) and an adapter that provides a secure ground connection while also providing a simple push/pull connection.

Coaxial cables are commonly used in the cable television industry to carry cable TV signals to television sets in homes, businesses, and other locations.

Exemplary flexible coaxial cables include a solid wire core or inner conductor, typically of copper or copper-clad aluminum, surrounded by a flexible tubular outer conductor. The outer conductor is also usually made of woven copper or aluminum. Dielectric material or insulation separates the inner and outer conductors. The outer conductor is covered with a cable jacket or sheath of plastic to provide protection against corrosion and weathering.

The ability of a connector to make a solid mechanical connection and solid electrical connections to an adapter is required to achieve long term performance as well as facilitate proper signal transmission through the interface with minimal loss or disruption of the signal. Threaded interfaces that include swivel cable connectors on either the connector or the adapter have been employed to provide a way to connect a cable to an interface port or other device without introducing a twist into the cable.

It may be desirable to provide an interface that overcomes one or more of the aforementioned disadvantages of other interfaces. That is, it may be desirable to provide an interface having strong mechanical and electrical connections that also makes these connections in a way that is easy for a non-technician user to achieve. It may also be desirable to provide a structure that reduces radio frequency leakage from the inner conductor and/or reduces radio frequency noise reaching the inner conductor.

SUMMARY

Embodiments of the disclosure include biasing members that may be configured to provide axial and radial biasing forces so as to provide a secure ground connection between a connector portion and an adapter portion and such that a push/pull connection between the connector portion and the adapter portion that is operable by a non-technician user is permitted.

Embodiments of the disclosure include a biasing portion that may be configured to prevent a direct, line of sight path through a space in the biasing portion from an outside of the biasing portion to a longitudinal centerline of the biasing portion so as to prevent a direct path through the spaces for radio-frequency signals from outside the connector assembly to a center conductor of a cable connected by the connector assembly such that radio-frequency noise received by the center conductor is reduced.

The present disclosure provides cable connector assembly that may include: a connector portion that may comprise a compression member that may have a rearward cable receiving end and a forward end opposite the rearward end, a first body portion that may have a rearward end and a forward end opposite the rearward end, the rearward end may be configured to be coupled with the forward end of the compression member, a second body portion that may have a rearward end and a forward end, the rearward end may be configured to be coupled with the forward end of the first body portion, and an outer conductor engager that may be supported within the first body portion and the second body portion, the outer conductor engager having a rearward end portion; an adapter portion that may have an adapter body portion, a coupling portion that may be configured to connect the adapter body portion to a device; a biasing portion that may be configured to be received in the adapter body portion and that may be configured to be coupled with the second body portion of the connector portion. The biasing portion may comprise a plurality of biasing members; the biasing members may be configured to be separated by spaces that may be configured to allow the biasing members to elastically deform radially inwardly; the second body portion may comprise an adapter receiving portion that may be configured to receive the biasing members; the biasing members may be configured to exert a biasing force axially against the adapter receiving portion so as to bias the biasing portion toward the rearward end of the second body portion; the biasing force may be configured to resist an external separating force for separating the adapter portion from the connector portion; the biasing members may be configured to exert a radial biasing force outwardly against the second body portion; and the biasing members may be configured to provide the axial and radial biasing forces to provide a secure ground connection between the connector portion and the adapter portion and allow a push/pull connection between the connector portion and the adapter portion.

In embodiments, the cable receiving end may comprise a cable receiving opening configured to receive a coaxial cable.

Embodiments further comprise an engagement surface on the adapter body portion, the engagement surface may be configured to receive a tool for connecting the adapter body portion to the device.

Embodiments further comprise a center conductor receiving portion that may be configured to be received in the biasing portion and the adapter body portion, may be configured to receive a center conductor of a coaxial cable at a forward end of the adapter portion, may be configured to receive a second conductor from a rearward end of the adapter portion, and may be configured to electrically connect the center conductor of the coaxial cable and the second conductor.

In embodiments, the biasing members may extend from a forward end of the adapter portion.

In embodiments, the second body portion may comprise an interior surface and a ramp portion that may be configured to extend radially inward from the interior surface toward a center axis of the connector portion.

In embodiments, the adapter receiving portion may be configured adjacent to the ramp portion on a rearward side of the ramp portion.

In embodiments, the adapter receiving portion may be located a greater distance from the central axis of the connector than is an inward most portion of the ramp portion, and the ramp portion may be configured to form a lip portion that may extend radially inward relative to the adapter receiving portion.

In embodiments, each of the biasing members may comprise an engagement portion that is an outermost portion of the biasing member.

In embodiments, the engagement portion may be configured to contact the adapter receiving area and may be configured to apply the radial biasing force on the adapter receiving portion.

In embodiments, the biasing member may be configured to contact the ramp portion and may be configured to apply the axial biasing force to the ramp portion.

In embodiments, the biasing members may be configured to prevent a direct, line of sight path through the spaces between an outside of the biasing portion to a longitudinal centerline of the biasing portion.

The present disclosure provides a cable connector assembly that may include: a connector portion that may comprise a compression portion, a first body portion that may be configured to be coupled to the compression portion; a second body portion that may be configured to be coupled to the first body portion; an adapter portion that may include an adapter body portion; a biasing portion that may be configured to be received in the adapter body portion. The biasing portion may be configured to be coupled to the second body portion; the biasing portion may be configured to elastically deform radially inward; the second body portion may comprise an adapter receiving portion that may be configured to receive the biasing portion; the biasing portion may be configured to exert an axial biasing force against the adapter receiving portion; the biasing portion may be configured to exert a radial biasing force outwardly against the second body portion; and the biasing portion may be configured to provide the axial and radial biasing forces to provide a secure ground connection between the connector portion and the adapter portion and allow a push/pull connection between the connector portion and the adapter portion.

In embodiments, the adapter portion may comprise a coupling portion that may be configured to connect the adapter body portion to a device.

In embodiments, the axial biasing force may be configured to bias the biasing portion toward a rearward end of the second body portion.

In embodiments, the axial biasing force may be configured to resist an external separating force, the external separating force being for separating the adapter portion from the connector portion.

In embodiments, the second body portion may comprise an interior surface and a ramp portion that may be configured to extend radially inward from the interior surface toward a center axis of the connector portion.

In embodiments, the adapter receiving portion may be configured adjacent to the ramp portion on a rearward side of the ramp portion.

In embodiments, the biasing portion may comprise an engagement portion that is an outermost portion of the biasing portion.

In embodiments, the engagement portion may be configured to contact the adapter receiving portion and may be configured to apply the radial biasing force on the adapter receiving portion.

In embodiments, the biasing portion may be configured to contact the ramp portion and may be configured to apply the axial biasing force to the ramp portion.

In embodiments, the biasing portion may be configured to prevent a direct, line of sight path through spaces in the biasing portion between an outside of the biasing portion to a longitudinal centerline of the biasing portion.

In embodiments, the biasing portion may comprise a plurality of biasing members, and the biasing members may be configured to be separated by spaces that may be configured to allow the biasing members to elastically deform radially inward.

The present disclosure provides cable connector assembly that may include: a connector portion that may comprise a first body portion and a second body portion that may be configured to be coupled to the first body portion; and an adapter portion that may comprise a biasing portion. The biasing portion may be configured to be coupled to the second body portion; the biasing portion may be configured to allow the biasing portion to elastically deform radially; the biasing portion may be configured to exert a first biasing force against the second body portion; the biasing portion may be configured to exert a second biasing force against the second body portion; and the biasing portion may be configured to provide a secure ground connection between the connector portion and the adapter portion and allow a push/pull connection between the connector portion and the adapter portion.

In embodiments, the second body portion may comprise an adapter receiving portion configured to receive the biasing portion.

In embodiments, the first biasing force may be configured to resist an external separating force, the external separating force being for separating the adapter portion from the connector portion.

In embodiments, the second body portion may comprise an interior surface and a ramp portion that may be configured to extend radially inward from the interior surface toward a center axis of the connector portion.

In embodiments, the second body portion may comprise an adapter receiving portion that may be configured to receive the biasing portion, and the adapter receiving portion may be configured adjacent to the ramp portion on a rearward side of the ramp portion.

In embodiments, the second biasing force is a radial force, the biasing portion may comprise an engagement portion that is an outermost portion of the biasing portion, and the engagement portion may be configured to contact the adapter receiving portion and may be configured to apply the radial biasing force on the adapter receiving portion.

In embodiments, the second biasing force is an axial biasing force, and the biasing portion may be configured to contact the ramp portion and may be configured to apply the axial biasing force to the ramp portion.

In embodiments, the biasing portion may comprise a space, and the biasing portion may be configured to prevent a direct, line of sight path through the space between an outside of the biasing portion to a longitudinal centerline of the biasing portion.

In embodiments, the biasing portion may comprise a plurality of biasing members.

In embodiments, the biasing portion may comprise spaces between the biasing members to allow the biasing members to elastically deform radially.

In embodiments, the biasing portion may be configured to allow the biasing portion to elastically deform radially inwardly.

In embodiments, the biasing portion may be configured to exert an axial biasing force axially against the second body portion.

In embodiments, the biasing portion may be configured to exert an outward radial biasing force radially against the second body portion.

The present disclosure provides a cable connector assembly that may include: a connector portion that may comprise a first body portion and a second body portion that may be configured to be coupled to the first body portion; and an adapter portion that may comprise a biasing portion. The biasing portion may be configured to be coupled to the second body portion; the biasing portion may be configured to elastically deform radially inwardly; and the biasing portion may be configured to prevent a direct, line of sight path through a space in the biasing portion from an outside of the biasing portion to a longitudinal centerline of the biasing portion so as to prevent a direct path through the spaces for radio-frequency signals from outside the connector assembly to a center conductor of a cable connected by the connector assembly so as to reduce radio-frequency noise received by the center conductor.

In embodiments, the biasing portion may comprise a plurality of biasing members that may be configured to exert an axial biasing force axially against the second body portion, and the biasing members may be configured to exert an outward radial biasing force against the second body portion.

In embodiments, the axial and radial biasing forces may provide a secure ground connection between the connector portion and the adapter portion and allow a push/pull connection between the connector portion and the adapter portion.

In embodiments, the space may comprise a plurality of spaces, and a first space of the spaces may intersect a second space of the spaces.

In embodiments, the space may comprise a plurality of spaces, and a first space of the spaces may be parallel to a second space of the spaces.

In embodiments, a first biasing member of the biasing members may be configured to have a first shape, a second biasing member of the biasing members may be configured to have a second shape, and the first shape and second shape are different shapes.

Various aspects of the coaxial connector, as well as other embodiments, objects, features and advantages of this disclosure, will be apparent from the following detailed description of illustrative embodiments thereof, which is to be read in conjunction with the accompanying drawings.

DETAILED DESCRIPTION OF EMBODIMENTS

Embodiments of the disclosure include biasing members that may be configured to provide axial and radial biasing forces so as to provide a secure ground connection between a connector portion and an adapter portion and such that a push/pull connection between the connector portion and the adapter portion that is operable by a non-technician user is permitted.

Embodiments of the disclosure include a biasing portion that may be configured to prevent a direct, line of sight path through a space in the biasing portion from an outside of the biasing portion to a longitudinal centerline of the biasing portion so as to prevent a direct path through the spaces for radio-frequency signals from outside the connector assembly to a center conductor of a cable connected by the connector assembly such that radio-frequency noise received by the center conductor is reduced.

Figure 1:
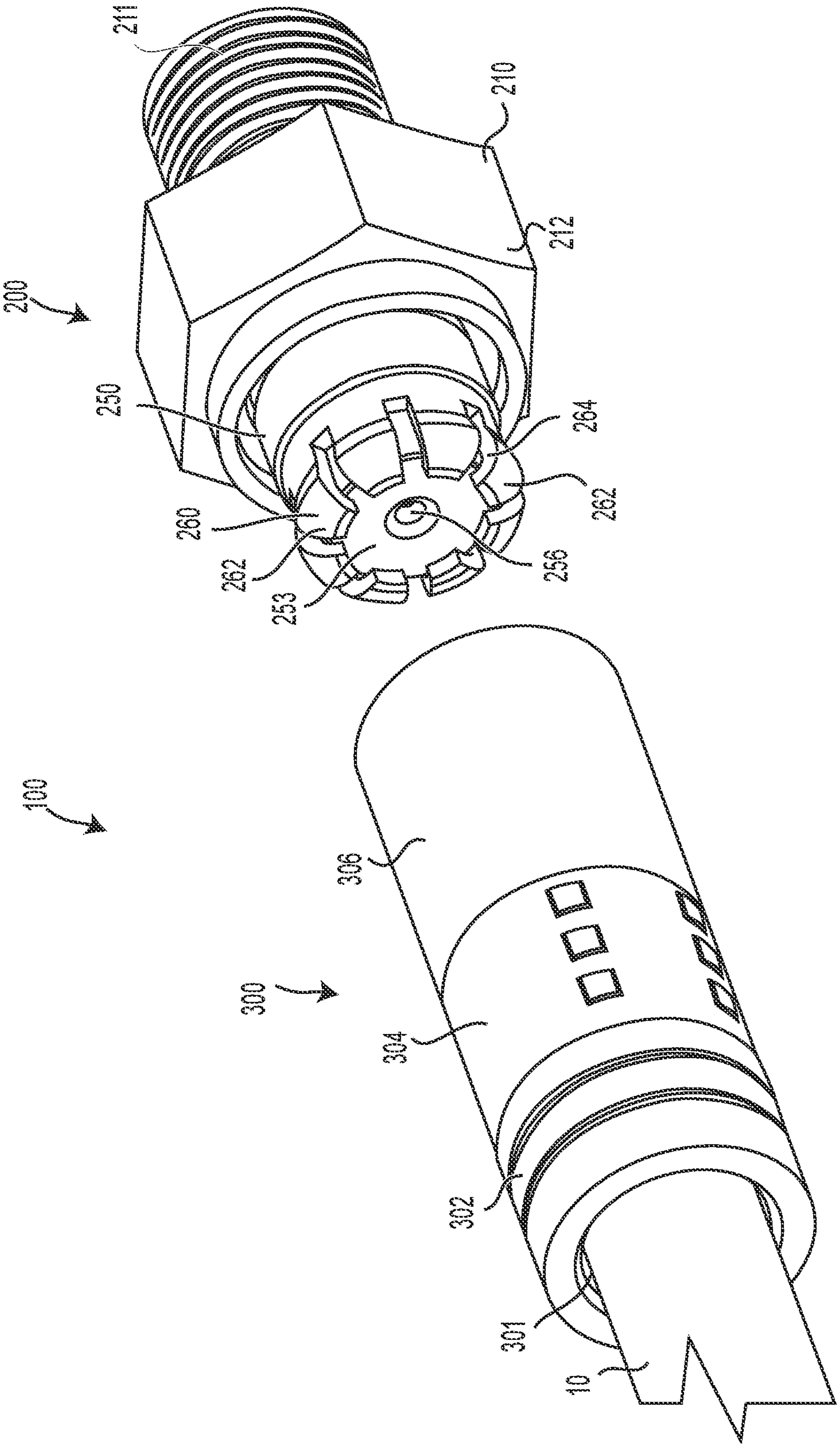
FIG. 1 is a perspective view of an exemplary coaxial connector and adapter in accordance with various aspects of the disclosure in a separated state.

FIG. 1 shows a perspective view of an exemplary connector/adapter interface assembly 100 in accordance with various aspects of the disclosure. The connector/adapter interface assembly 100 includes a connector 300 and an adapter 200 that are configured to be connected to one another while providing both electrical and mechanical connections therebetween. While embodiments of the disclosure are shown and described using the connector/adapter assembly 100, embodiments of the disclosure include interfaces between other devices involving the connection of a coaxial cable.

Figure 2:
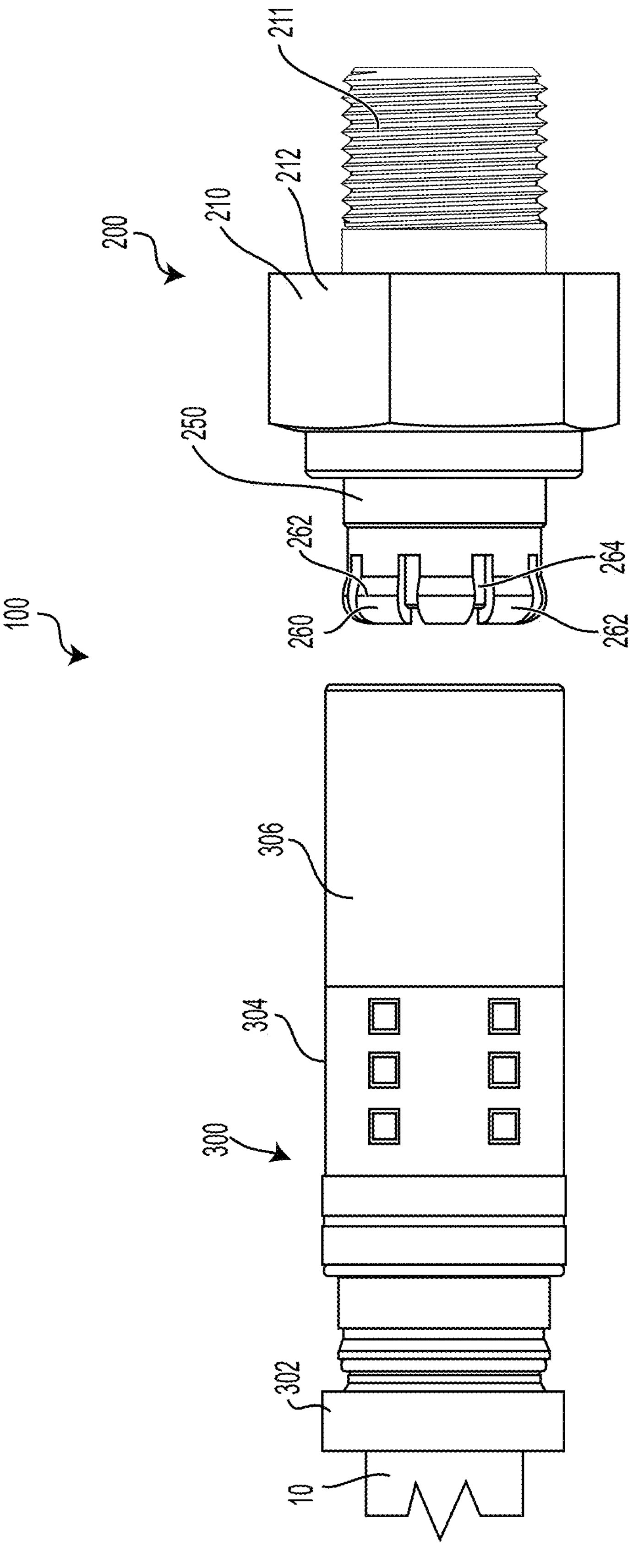
FIG. 2 is a side view of the connector and adapter of FIG. 1 in a separated state.

As shown in FIGS. 1 and 2, the adapter 200 has a biasing portion 260 that is inserted into the connector 300 to hold the adapter 200 and the connector 300 together such that electrical connections and a mechanical connection are securely maintained.

Figure 3:
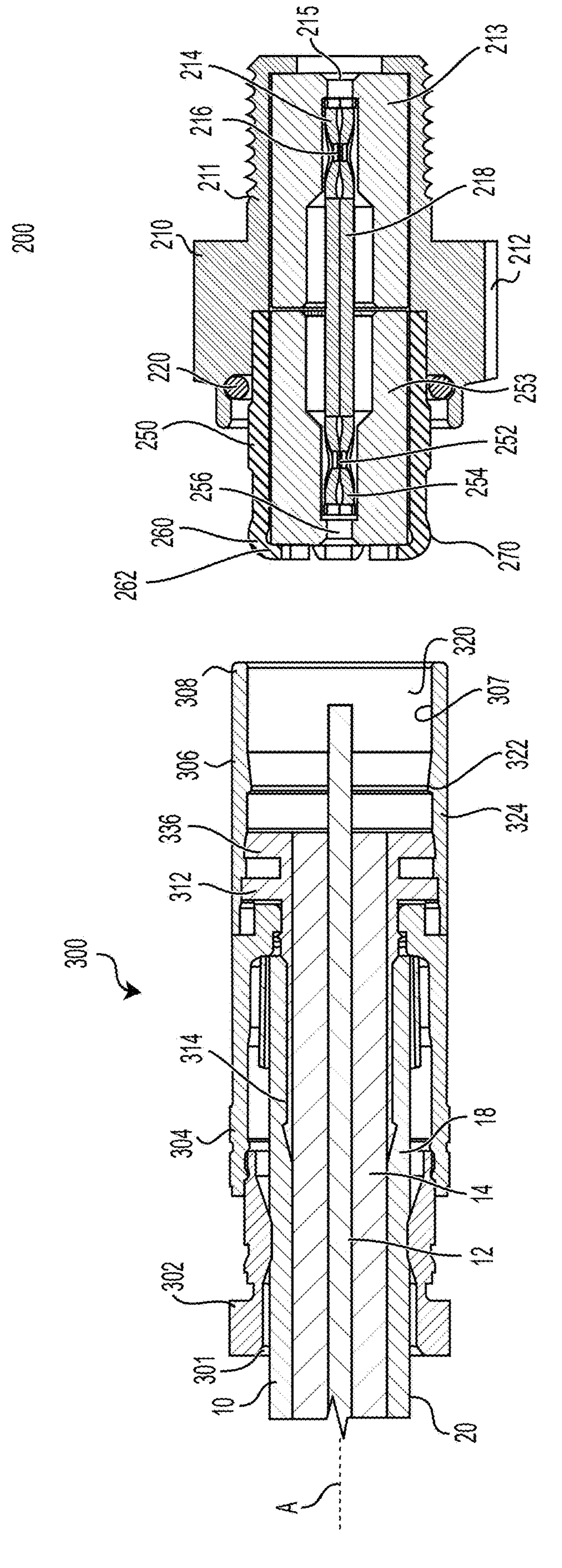
FIG. 3 is a side cross-sectional view of the connector and adapter of FIG. 1 in a separated state.

FIG. 1 shows the connector 300 in a state in which the connector 300 is fully connected to a coaxial cable 10. FIGS. 2 and 3 show the connector 300 in a state in which the coaxial cable 10 is inserted into the connector 300, but the connector 300 has not yet been compressed to reach the state shown in FIG. 1. In this example, the connector 300 has a compression member, for example, a compression ring, 302 at a rearward end of the connector 300 which has an opening 301 configured to receive the coaxial cable 10. As shown in FIG. 3, the coaxial cable 10 generally includes a solid center conductor 12 typically formed from a conductive metal, such as copper, copper clad aluminum, copper clad steel, or the like capable of conducting electrical signals therethrough. Surrounding the center conductor 12 is a dielectric 14, which insulates the center conductor 12 to minimize signal loss. The dielectric 14 also maintains a spacing between the center conductor 12 and an outer conductor (e.g. a shield) 18. The dielectric 14 is often a plastic material, such as a polyethylene, a fluorinated plastic material, such as a polyethylene or a polytetrafluoroethylene, a fiberglass braid, or the like. The outer conductor 18 is typically flexible and made of metal, such as aluminum or copper braid. An insulative cable jacket 20 may surround the outer conductor 18 to further seal the coaxial cable 10. The cable jacket 20 is typically made of plastic, such as polyvinylchloride, polyethylene, polyurethane, or polytetrafluoroethylene.

The connector 300 includes a plurality of components generally having a coaxial configuration about an axis A defined by the center conductor 12 of the coaxial cable 10. A second body portion, for example, a nose portion, 306 receives an outer conductor engager, for example, a post, 312 in an axial bore from a rearward direction which is opposite to the adapter 200. The nose portion 306 is an electrically conductive material such as aluminum, brass, or the like. The post 312 is an electrically conductive material such as aluminum, brass, or the like and has a cylindrical portion 314 that extends in the rearward direction and includes an axial bore. The post 312 has a flange 336 that is configured to engage the inner wall of the nose portion 306. The flange 336 provides additional surface area of electrical contact with the nose portion 306. The cylindrical portion 314 extends rearward from the flange 336. A first body portion, for example, an outer body, 304 is coupled with the post 312. When the coaxial cable 10 is inserted into connector 300, the cylindrical portion 314 penetrates the coaxial cable 10 between the dielectric 14 and the outer conductor 18. In an assembled state, the cylindrical portion 314 forms an electrically conductive connection with the outer conductor 18.

The outer body 304 extends partially into the nose portion 306 and is limited in movement relative to the nose portion 306 in the axial direction. In embodiments, a knurled or other engaging interface exists between the outer body 304 and the post 312 to prevent the post 312 from rotating relative to the outer body 304.

The compression ring 302 extends axially partially onto the outer body 304. During connection of the coaxial cable 10 to the connector 300, the coaxial cable 10 is inserted into the opening 301 in the compression ring 302 and into contact with the post 312. The leading edge of the cylindrical portion 314 separates the outer conductor 18 from the dielectric 14. In the assembled state, the center conductor 12 extends into a receiving opening 320 in the nose portion 306. The receiving opening 320 is configured to receive the biasing portion 260 of the adapter 200. In the assembled state of the connector 300, an electrically conductive path is formed from the outer conductor 18 through the post 312 and the nose portion 306.

The adapter 200 has a main body 210 that includes an engagement surface 212 that, in this example, is a hex surface. The engagement surface 212 is configured to receive a tool, or a user's fingers, to facilitate rotation of the main body 210. In this example, the main body 210 includes a coupling portion 211, for example, a threaded portion 211 that is configured to engage a threaded portion of a device to which the adapter 200 is to be coupled. The rotation of the main body 210 can facilitate connection of the adapter 200 to the connector 300, as well as engage the threaded portion 211 with a threaded portion of the device.

The adapter 200 has a biasing body 250 that is received in the main body 210. In embodiments, the biasing body 250 is press fit into the main body 210. The biasing body 250 has a biasing portion 260 that exerts both a radial biasing force and an axial biasing force on the nose portion 306 of the connector 300. In this example, the biasing portion 260 is configured as a plurality of biasing members 262 that extend radially from a forward end of the biasing body 250. The biasing members 262 are separated from each other by spaces 264 that allow the biasing members 262 to bend radially inward toward a central axis of the adapter 200. As shown in FIG. 3, a forward dielectric 253 is located inside the biasing body 250. Also shown in FIG. 3 is a rearward dielectric 213 located in the main body 210 of the adapter 200. A center conductor connector 218 is located along the central axis of the adapter 200 and positioned within the forward dielectric 253 and the rearward dielectric 213. The forward dielectric 253 has an opening 256 that is configured to receive the center conductor 12 of the coaxial cable 10. The rearward dielectric 213 has an opening 215 that is configured to receive a conductor of the device to which the adapter 200 is to be connected.

The biasing body 250 being a separate piece from the main body 210 allows assembly of the forward dielectric 253 inside the biasing body 250, the rearward dielectric 213 inside the main body 210, and the center conductor connector 218 inside both the forward dielectric 253 and the rearward dielectric 213.

The center conductor connector 218 has at its forward end a center conductor receiving portion 254 (such as, for example, a milmax connector) configured to receive and make an electrically conductive connection with the center conductor 12 of the coaxial cable 10. The center conductor receiving portion 254 has a constricted portion 252 that is configured to press radially inwardly against the center conductor 12 of the coaxial cable 10 to form a secure mechanical and electrical connection with the center conductor 12. In an assembled state, the center conductor 12 extends into the constricted portion 252 of the center conductor receiving portion 254. The center conductor connector 218 has at its rearward end a second conductor receiving portion 214 (such as, for example, a milmax connector) configured to receive and make an electrically conductive connection with a conductor ("second conductor") of the device to which the adapter 200 is to be connected. The second conductor receiving portion 214 has a constricted portion 216 that is configured to press radially inwardly against the second conductor to form a secure mechanical and electrical connection with the second conductor. In an assembled state, the second conductor extends into the constricted portion 216 of the second conductor receiving portion 214.

As shown in FIG. 3, the nose portion 306 has an interior surface 307. A ramp 322 extends radially inward from the interior surface 307 toward a center axis of the connector 300. An adapter receiving portion, for example, a receiving area 324 is formed adjacent to the ramp 322 on a rearward side of the ramp 322. The receiving area 324 is a greater distance from the central axis of the connector 300 than is an inward most portion of the ramp 322. As a result, the ramp 322 forms a lip that extends radially inward compared to the receiving area 324. As shown in FIG. 3, the biasing members 262 have an engagement portion 270 that is the outermost portion of each biasing member 262.

Figure 4:
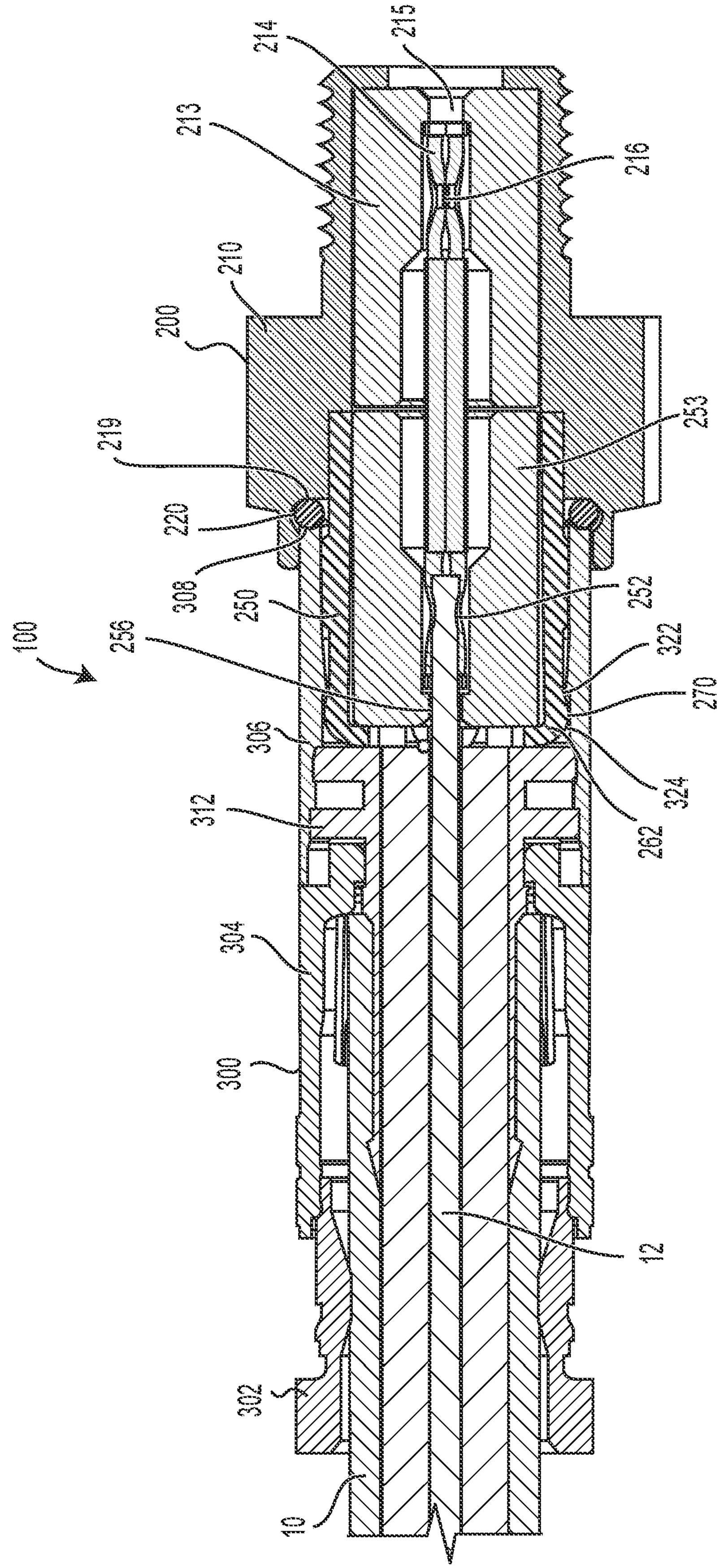
FIG. 4 is a side cross-sectional view of the connector and adapter of FIG. 1 in a connected state.

FIG. 4 shows the adapter 200 and the connector 300 in a connected state. Although the connector 300 is shown in FIG. 4 in a state before the compression ring 302 has been pushed into the outer body 304, it is noted that compression ring 302 will normally be pushed into the outer body 304 before the connector 300 is connected to the adapter 200 (as shown in FIG. 1). In FIG. 4, the engagement portion 270 of the biasing body 250 is shown in the receiving area 324 of the nose portion 306. In this position, the engagement portion 270 is located on the rearward (inward) side of the ramp 322. In the position shown in FIG. 4, the engagement portion 270 exerts an outward radial force on the ramp 322 due to the radially compressed state (and the resilient nature) of the biasing member 262. This radial force urges the biasing body 250 (and thus the adapter 200) into the nose portion 306 by creating an axial force acting on a back side of the ramp 322. This axial force creates a secure mechanical connection between the adapter 200 and the connector 300. The radial force (and the axial force) between the engagement portion 270 and the ramp 322 (and the receiving area 324) creates a secure electrical connection (a grounding connection) between the biasing body 250 (and thus the adapter 200) and the nose portion 306 (and thus the connector 300).

FIG. 4 shows an O-ring 220 is located between the nose portion 306 and the main body 210. The O-ring 220 forms a water-proof or water-resistant barrier between the nose portion 306 and the main body 210 to prevent water and/or other contaminants from entering the assembly. An axial compression of O-ring 220 between an end surface 308 of the nose portion 306 and a surface 219 of the main body 210 creates an axial biasing force that urges the main body 210 (and thus the biasing body 250) to the right in FIG. 4 relative to the nose portion 306. This biasing force keeps the engagement portion 270 of the biasing portion 262 firmly in contact with the back side of the ramp 322, which produces a more secure electrical connection between the biasing portion 262 and the nose portion 306.

The described embodiments provide various advantages including a simple and reliable push/pull connection that provides a secure conductivity path from the outer conductor of the coaxial cable 10 to the adapter 200.

Figure 5:
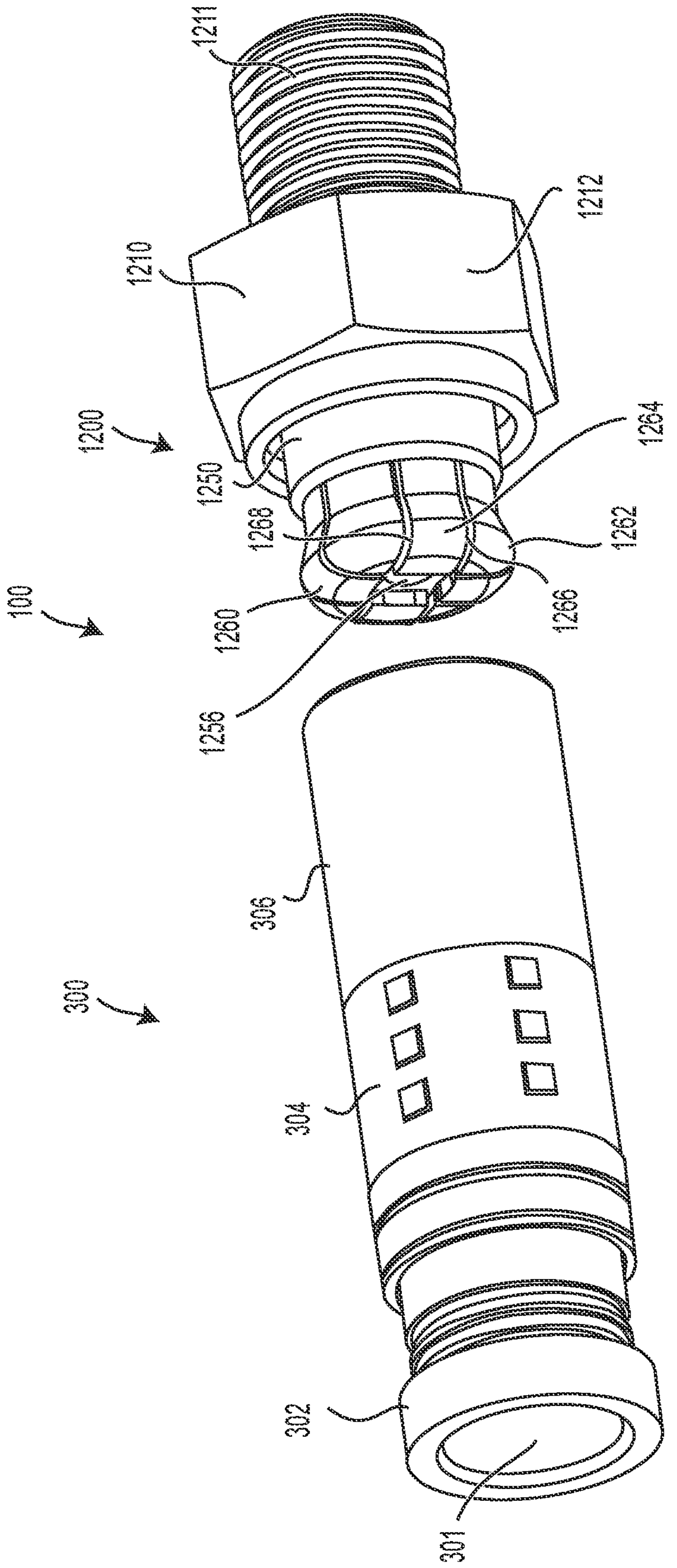
FIG. 5 is a perspective view of an exemplary coaxial connector and adapter in accordance with various aspects of the disclosure in a separated state.

FIG. 5 shows a perspective view of an exemplary connector/adapter interface assembly 100 in accordance with various aspects of the disclosure. The connector/adapter interface assembly 100 includes the connector 300 and an adapter 1200 that are configured to be connected to one another while providing both electrical and mechanical connections therebetween. Embodiments provide a push/pull interface that does not require tools to connect the connector 300 to the adapter 1200, and is configured to minimize radio frequency leakage from, and/or radio frequency noise ingress to, the center conductor of a coaxial cable. While embodiments of the disclosure are shown and described using the connector/adapter assembly 100, embodiments of the disclosure include interfaces between other devices involving the connection of a coaxial cable.

Figure 6:
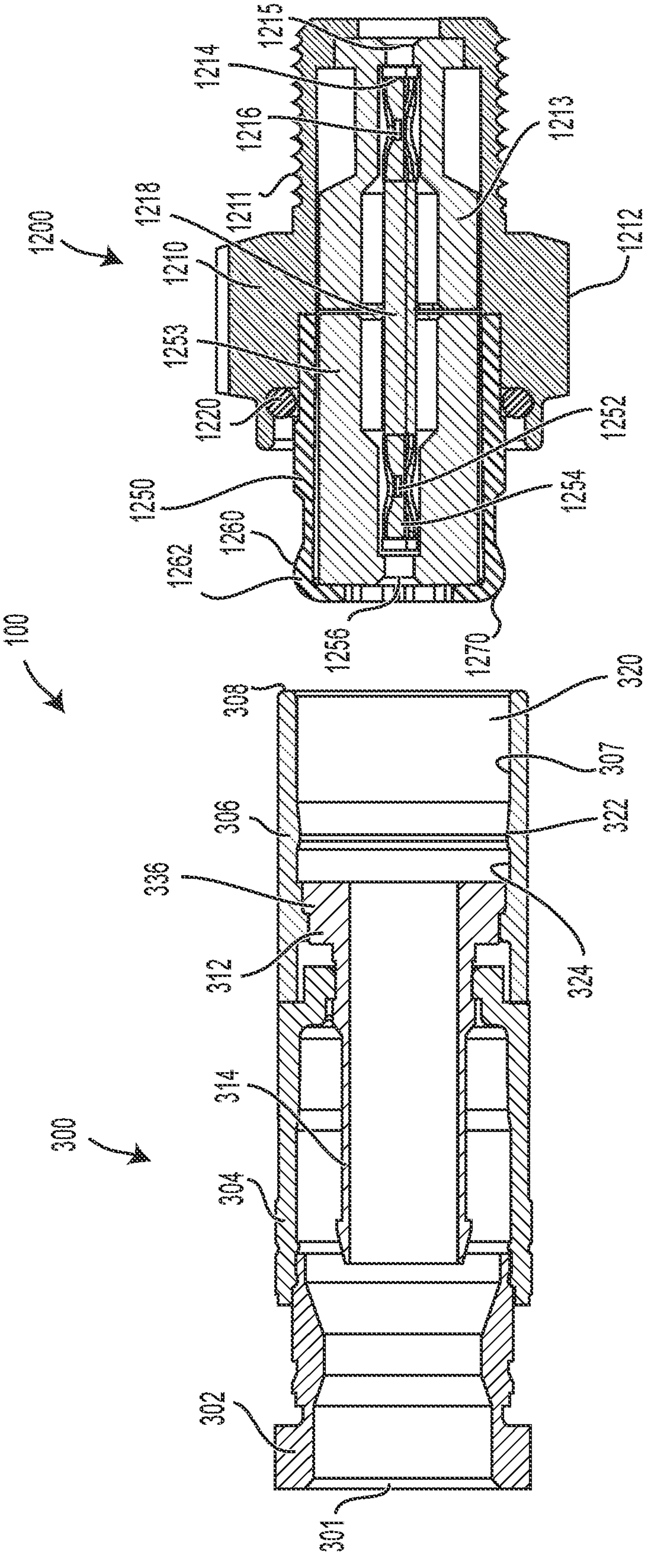
FIG. 6 is a side cross-sectional view of the connector and adapter of FIG. 5 in a separated state.
Figure 7:
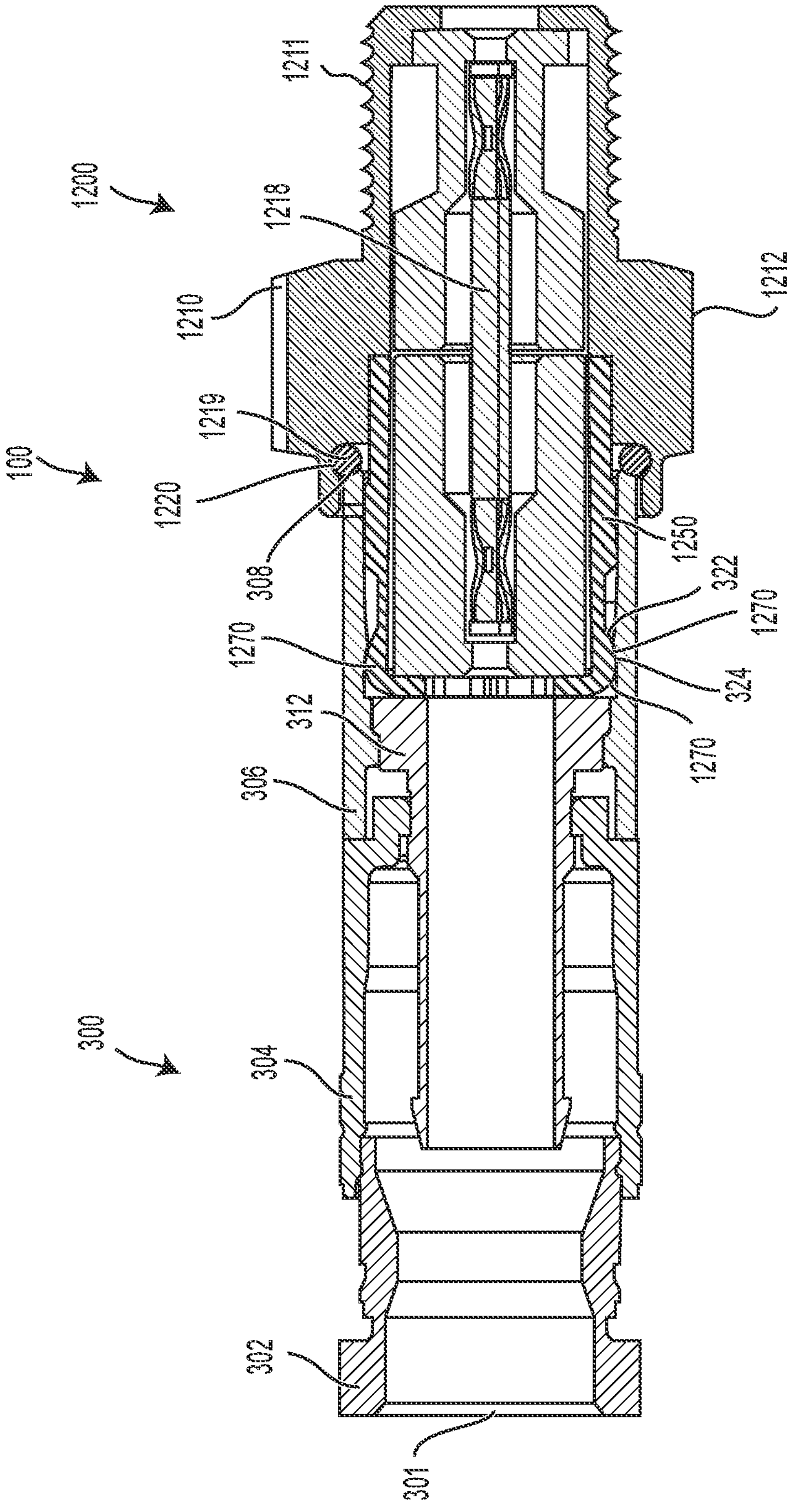
FIG. 7 is a side cross-sectional view of the connector and adapter of FIG. 5 in a connected state.
Figure 8:
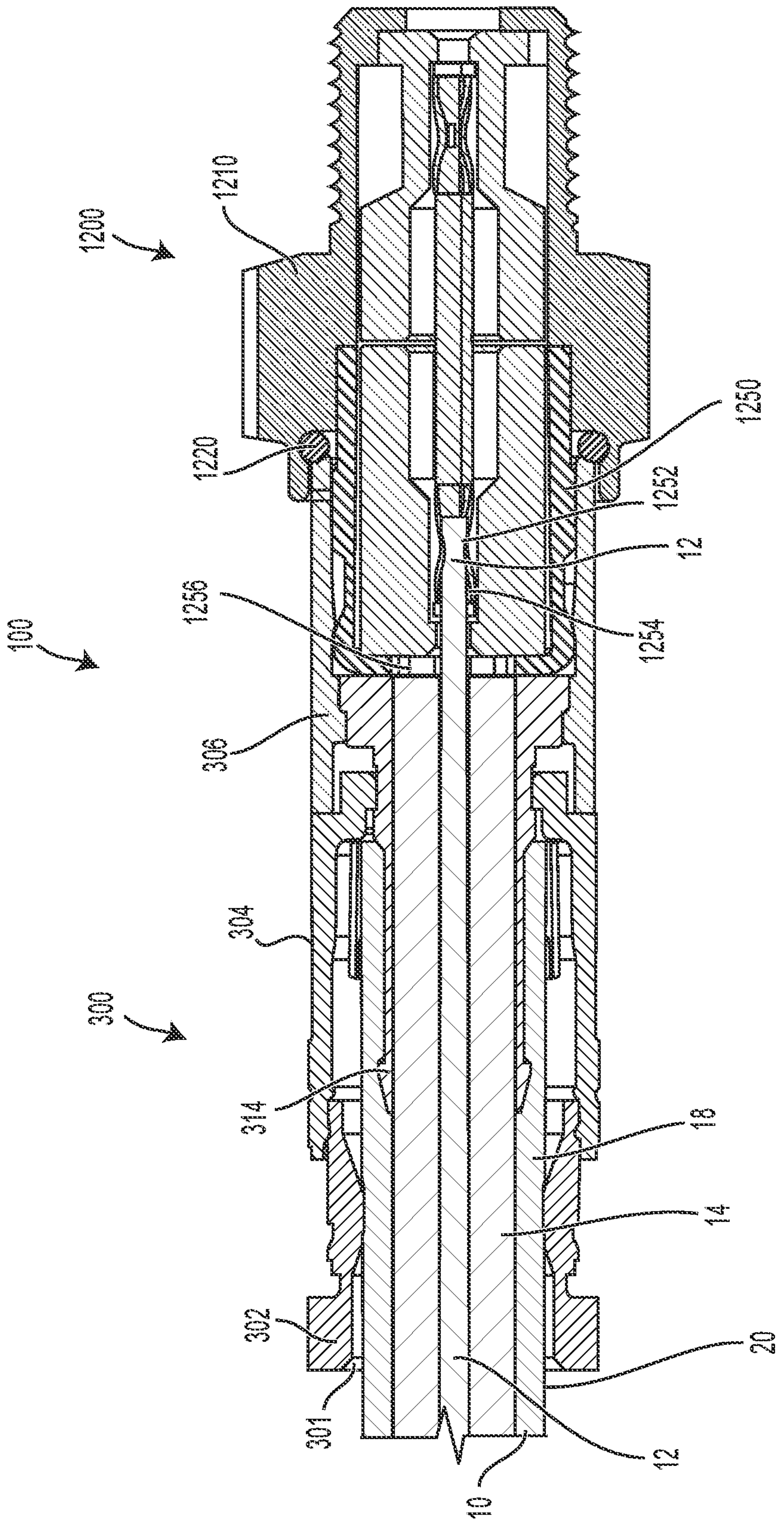
FIG. 8 is a side cross-sectional view of the connector and adapter of FIG. 5 in a connected state including a coaxial cable.

As shown in FIGS. 5 and 6, the adapter 1200 has a biasing portion 1260 that is inserted into the connector 300 to hold the adapter 1200 and the connector 300 together such that electrical connections and a mechanical connection are securely maintained. FIGS. 5-7 show the connector 300 without a coaxial cable for clarity. FIG. 8 shows a coaxial cable 10 in an installed position in the connector 300, but the connector 300 has not yet been compressed to reach the state shown in FIG. 1. In this example, the connector 300 is as shown and described above.

The adapter 1200 has a main body 1210 that includes an engagement surface 1212 that, in this example, is a hex surface 1212. The engagement surface 1212 is configured to receive a tool, or a user's fingers, to facilitate rotation of the main body 1210. In this example, the main body 1210 includes a threaded portion 1211 that is configured to engage a threaded portion of a device to which the adapter 1200 is to be coupled. The rotation of the main body 1210 can facilitate connection of the adapter 1200 to the connector 300, as well as engage the threaded portion 1211 with a threaded portion of the device.

The adapter 1200 has a biasing body 1250 that is received in the main body 1210. In embodiments, the biasing body 1250 is press fit into the main body 1210. The biasing body 1250 has a biasing portion 1260 that exerts both a radial biasing force and an axial biasing force on the nose portion 306 of the connector 300. In this example, the biasing portion 1260 is configured as a plurality of biasing members 1262, 1264 that extend from a forward end of the biasing body 1250. The biasing members 1262, 1264 are separated from each other by spaces 1266, 1267, 1268, 1269 that allow the biasing members 1262, 1264 to bend inward toward a central axis of the adapter 1200. As shown in FIG. 6, a forward dielectric 1253 is located inside the biasing body 1250. Also shown in FIG. 6 is a rearward dielectric 1213 located in the main body 1210 of the adapter 1200. A center conductor connector 1218 is located along the central axis of the adapter 1200 and positioned within the forward dielectric 1253 and the rearward dielectric 1213. The forward dielectric 1253 has an opening 1256 that is configured to receive the center conductor 12 of the coaxial cable 10. The rearward dielectric 1213 has an opening 1215 that is configured to receive a conductor of the device to which the adapter 1200 is to be connected.

The biasing body 1250 being a separate piece from the main body 1210 allows assembly of the forward dielectric 1253 inside the biasing body 1250, the rearward dielectric 1213 inside the main body 1210, and the center conductor connector 1218 inside both the forward dielectric 1253 and the rearward dielectric 1213.

The center conductor connector 1218 has at its forward end a center conductor receiving portion 1254 (such as, for example, a milmax connector) configured to receive and make an electrically conductive connection with the center conductor 12 of the coaxial cable 10. The center conductor receiving portion 1254 has a constricted portion 1252 that is configured to press radially inwardly against the center conductor 12 of the coaxial cable 10 to form a secure mechanical and electrical connection with the center conductor 12. In an assembled state, the center conductor 12 extends into the constricted portion 1252 of the center conductor receiving portion 1254. The center conductor connector 1218 has at its rearward end a second conductor receiving portion 1214 (such as, for example, a milmax connector) configured to receive and make an electrically conductive connection with a conductor ("second conductor") of the device to which the adapter 1200 is to be connected. The second conductor receiving portion 1214 has a constricted portion 1216 that is configured to press radially inwardly against the second conductor to form a secure mechanical and electrical connection with the second conductor. In an assembled state, the second conductor extends into the constricted portion 1216 of the second conductor receiving portion 1214.

As shown in FIG. 6, the biasing members 1262, 1264 have an engagement portion 1270 that is the outermost portion of each biasing member 1262, 1264.

FIGS. 7 and 8 show the adapter 1200 and the connector 300 in a connected state. Although the connector 300 is shown in FIGS. 7 and 8 in a state before the compression ring 302 has been pushed into the outer body 304, it is noted that the compression ring 302 will normally be pushed into the outer body 304 before the connector 300 is connected to the adapter 1200. In FIGS. 7 and 8, the engagement portions

1270 of the biasing body 1250 is shown in the receiving area 324 of the nose portion 306. In this position, the engagement portions 1270 are located on the rearward (inward) side of the ramp 322. In the position shown in FIGS. 7 and 8, the engagement portions 1270 exert an outward force on the ramp 322 due to the inward compressed state (and the resilient nature) of the biasing members 1262, 1264. This radial force urges the biasing body 1250 (and thus the adapter 1200) into the nose portion 306 by creating an axial force acting on a back side of the ramp 322. This axial force creates a secure mechanical connection between the adapter 1200 and the connector 300. The outward force (and the axial force) between the engagement portions 1270 and the ramp 322 (and the receiving area 324) creates a secure electrical connection (a grounding connection) between the biasing body 1250 (and thus the adapter 1200) and the nose portion 306 (and thus the connector 300).

FIGS. 7 and 8 show an O-ring 1220 is located between the nose portion 306 and the main body 1210. The O-ring 1220 forms a water-proof or water-resistant barrier between the nose portion 306 and the main body 1210 to prevent water and/or other contaminants from entering the assembly. An axial compression of O-ring 1220 between an end surface 308 of the nose portion 306 and a surface 1219 of the main body 1210 creates an axial biasing force that urges the main body 1210 (and thus the biasing body 1250) to the right in FIGS. 7 and 8 relative to the nose portion 306. This biasing force keeps the engagement portions 1270 of the biasing portions 1262, 1264 firmly in contact with the back side of the ramp 322, which produces a more secure electrical connection between the biasing portions 1262, 1264 and the nose portion 306.

Figure 15:
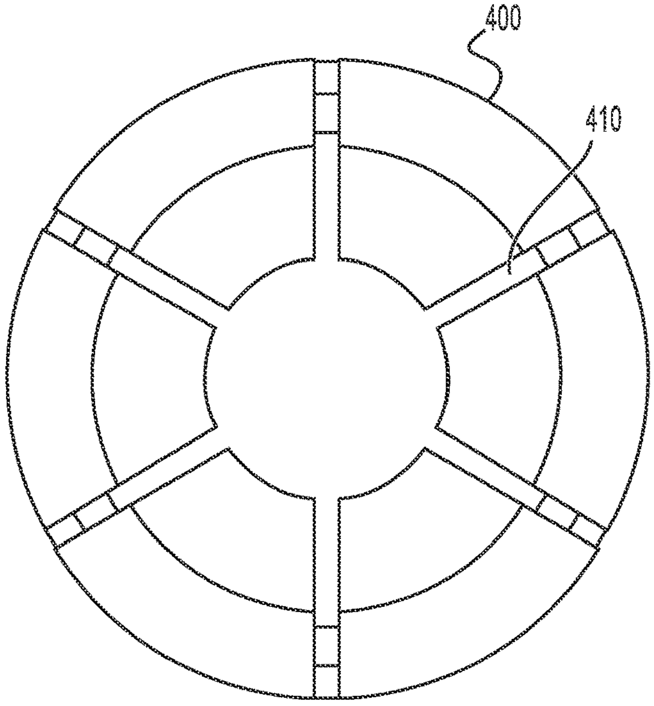
FIG. 15 is an end view of a biasing body having radially oriented spaces.

Embodiments of the disclosure use configurations of the biasing body 1250 that prevent direct, line of sight paths from outside the biasing body 1250 to the center conductor 12 of the coaxial cable 10. An example of a configuration of a biasing body 400 is shown in FIG. 15 that has radially directed spaces 410 between biasing portions that provide direct, line of sight paths from outside the biasing body 400 to the location of a center conductor of a coaxial cable. Such direct, line of sight paths can provide a direct route for radio frequency waves between outside the biasing body 400 and a center conductor of a coaxial cable, which can result in loss of signal strength and/or increased noise on the center conductor.

Figure 9:
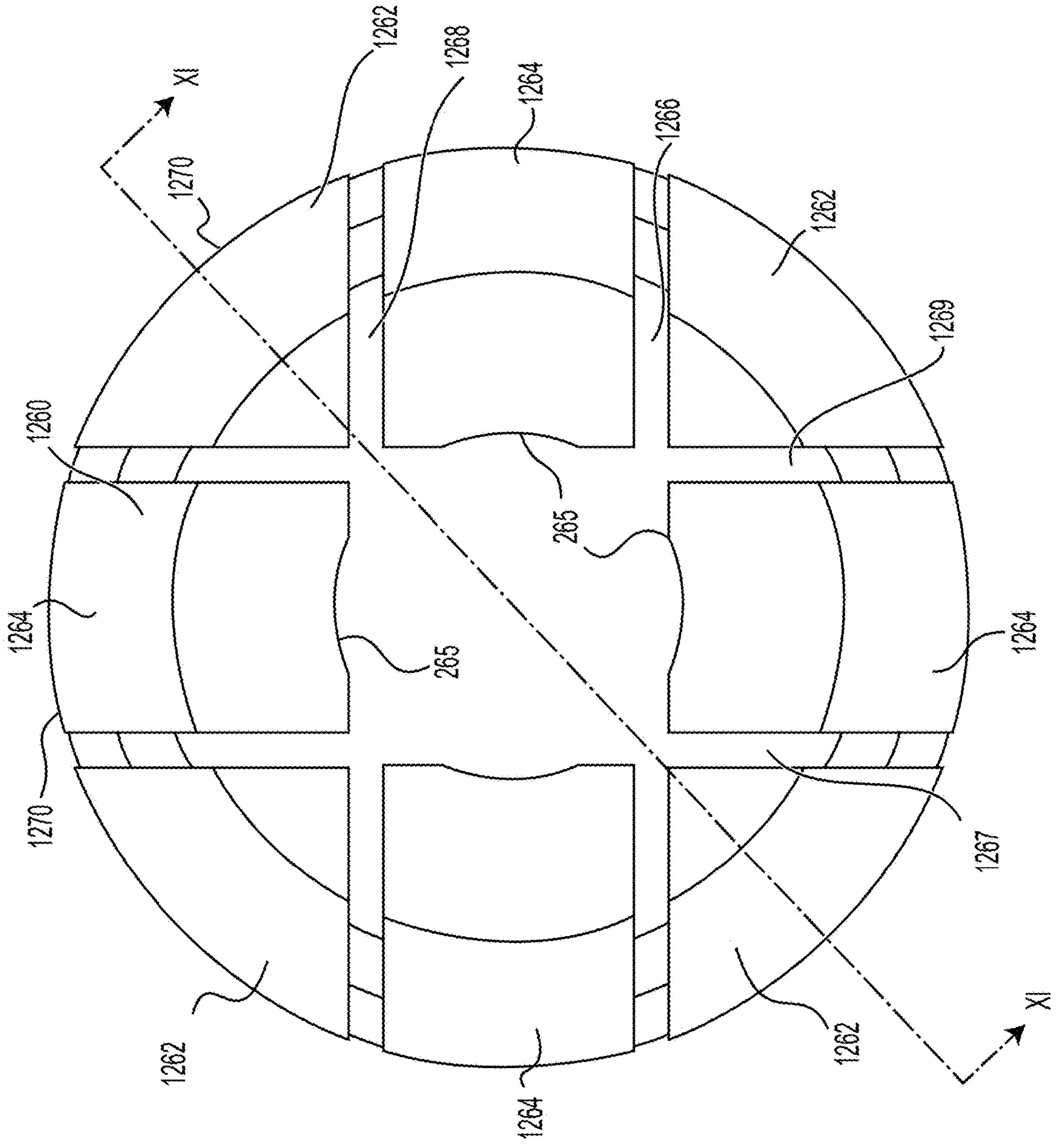
FIG. 9 is an end view of an exemplary biasing body in accordance with various aspects of the disclosure.
Figure 10:
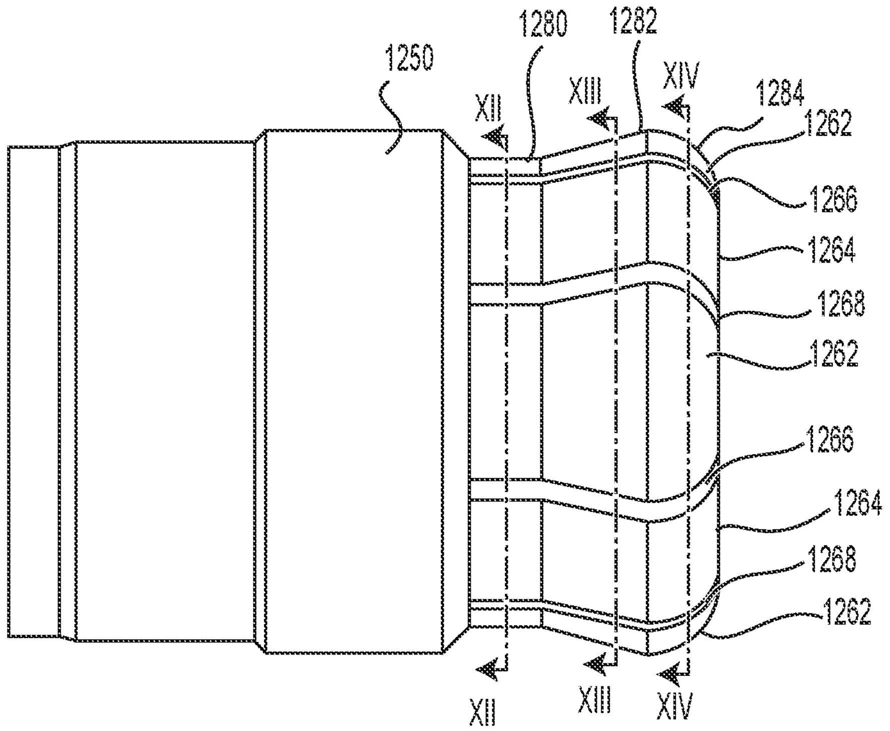
FIG. 10 is a side view of the biasing body of FIG. 9.
Figure 11:
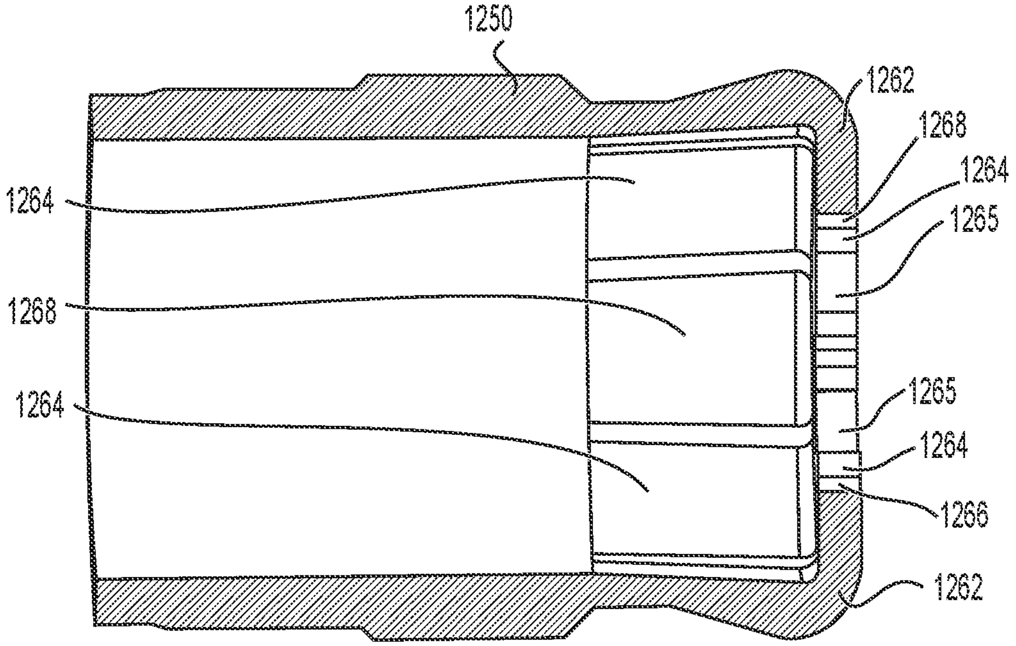
FIG. 11 is a side cross-sectional view of the biasing body of FIG. 9 taken along section line XI-XI in FIG. 9.

FIG. 9 shows an end view of biasing body 1250 and shows that the biasing body 1250 does not have direct, light of sight paths between the biasing portions 1262, 1264. As shown in FIG. 9, spaces 1266, 1267, 1268, 1269 extend horizontally and vertically instead of radially. The configuration shown in FIG. 9 is only one example of spaces that do not extend radially. Other configurations of biasing portions result in spaces that do not extend radially and, therefore, do not result in direct, line of sight paths for radio frequency waves to and from the center conductor of a coaxial cable. In the embodiment shown in FIG. 9, the biasing portion 1260 is made of eight biasing members 1262, 1264. Two of the spaces 1266, 1268 are formed parallel to each other and positioned perpendicular to another pair of spaces 1267, 1269. This configuration of spaces 1266, 1267, 1268, 1269 results in the biasing members 1262, 1264 having the shapes shown in FIG. 9. FIG. 10 shows a side view of the biasing body 1250 and further shows the shapes of biasing members 1262, 1264. FIG. 11 shows a cross-sectional view of the biasing body 1250 taken along section line XI-XI in FIG. 9 and shows radiused cutouts 1265 in the biasing members 1264 (also shown in FIG. 9).

Figure 12:
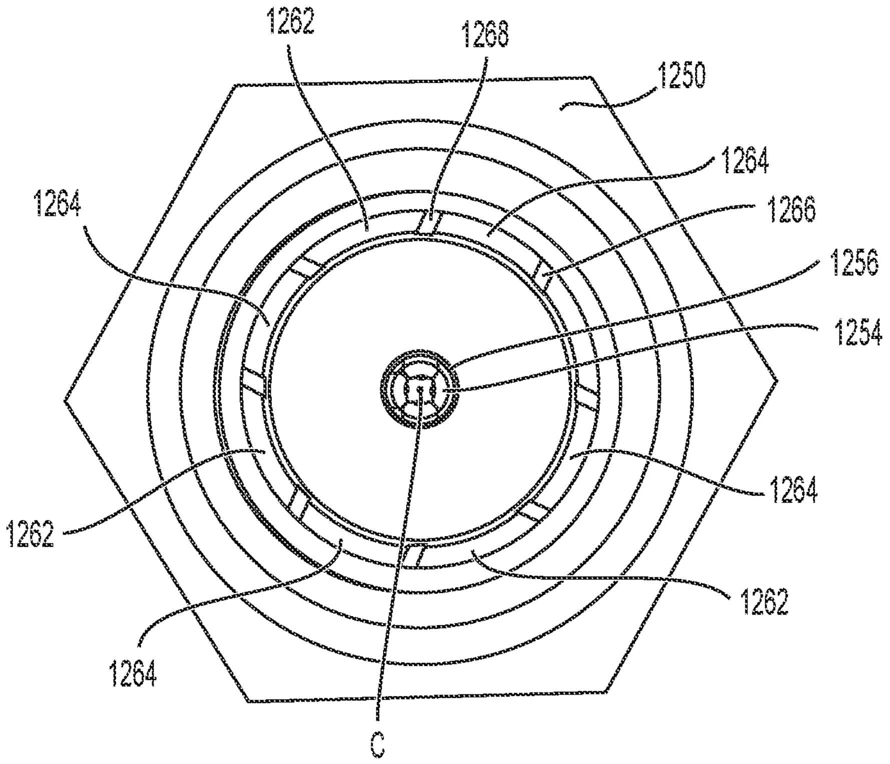
FIG. 12 is a cross-sectional view of the biasing body of FIG. 9 taken along section line XII-XII in FIG. 10.
Figure 13:
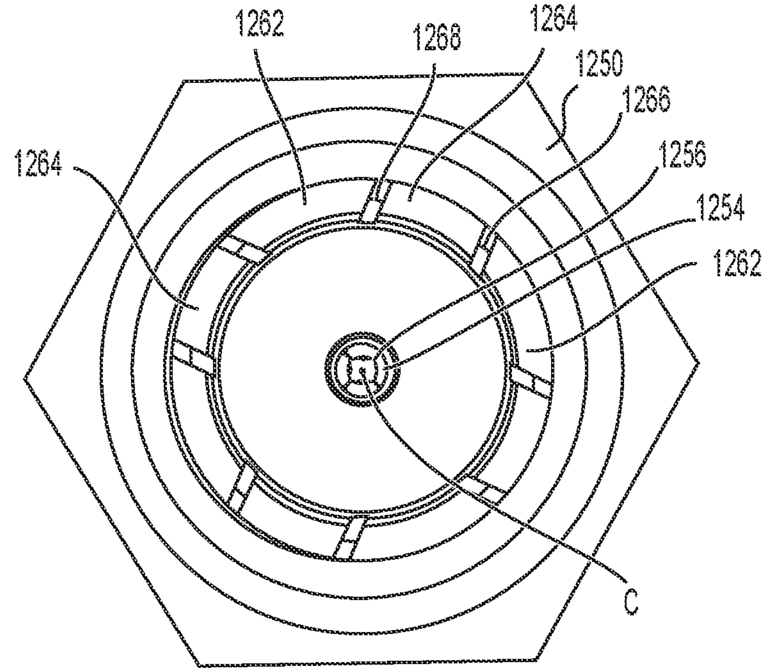
FIG. 13 is a cross-sectional view of the biasing body of FIG. 9 taken along section line XIII-XIII in FIG. 10.
Figure 14:
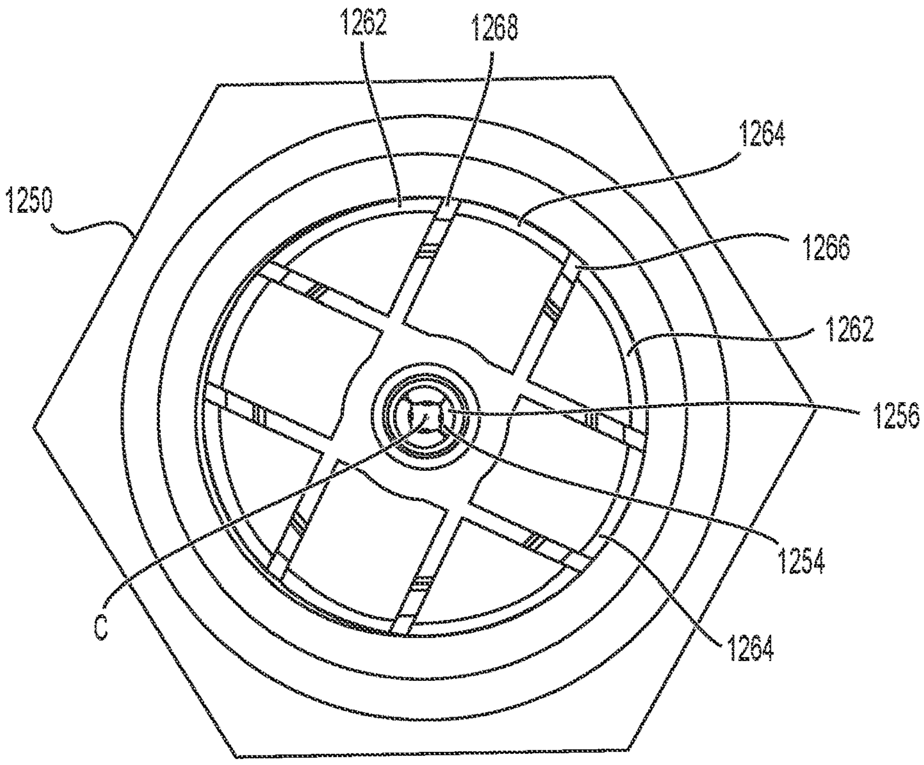
FIG. 14 is a cross-sectional view of the biasing body of FIG. 9 taken along section line XIV-XIV in FIG. 10.

FIGS. 12-14 show sectional views of the biasing body 1250 taken along section lines XII-XII, XIII-XIII, and XIV-XIV, respectively, shown in FIG. 10. FIG. 12 is a section taken at the smallest diameter portion 1280 of the biasing portion 1260 and shows a shortest path length between the outside of the biasing body 1250 and the center C of the biasing body 1250. As can be seen in FIG. 12, there is no direct, line of sight path through any of the spaces 1266, 1267, 1268, 1269 that passes though the center C of the biasing body 1250. This means that no direct, line of sight path exists between the outside of the biasing body 1250 and the center conductor of a coaxial cable in the biasing body 1250 at his location.

FIG. 14 is a section taken at the largest diameter portion 1284 of the biasing portion 1260 and shows a longest path length between the outside of the biasing body 1250 and the center C of the biasing body 1250. As can be seen in FIG. 14, there is no direct, line of sight path through any of the spaces 1266, 1267, 1268, 1269 that passes though the center C of the biasing body 1250. This means that no direct, line of sight path exists between the outside of the biasing body 1250 and the center conductor of a coaxial cable in the biasing body 1250 at his location.

FIG. 13 is a section taken at an intermediate diameter portion 1282 of the biasing portion 1260 and shows a medium path length between the outside of the biasing body 1250 and the center C of the biasing body 1250. As can be seen in FIG. 13, there is no direct, line of sight path through any of the spaces 1266, 1267, 1268, 1269 that passes though the center C of the biasing body 1250. This means that no direct, line of sight path exists between the outside of the biasing body 1250 and the center conductor of a coaxial cable in the biasing body 1250 at his location.

By configuring the biasing body 1250 (as shown, for example, in FIGS. 9-14) to prevent direct, line of sight paths from outside the biasing body 1250 to the center conductor 12 of the coaxial cable 10, a direct route for radio frequency waves between outside the biasing body 1250 and a center conductor of a coaxial cable is avoided. As a result, loss of signal strength and/or increased noise on the center conductor is reduced or substantially eliminated.

The described embodiments provide various advantages including a simple and reliable push/pull connection that provides a secure conductivity path from the outer conductor of the coaxial cable 10 to the adapter 1200, while minimizing radio frequency ingress and egress.

Although the illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

Various changes to the foregoing described and shown structures will now be evident to those skilled in the art. Accordingly, the particularly disclosed scope of the invention is set forth in the following claims.

What is claimed is:

1. A cable connector assembly configured to allow a push/pull connection, the cable connector assembly comprising:

a connector portion comprising a compression member having a rearward cable receiving end and a forward end opposite the rearward end, a first body portion having a rearward end and a forward end opposite the rearward end, the rearward end being configured to be coupled with the forward end of the compression member, a second body portion having a rearward end and a forward end, the rearward end being configured to be coupled with the forward end of the first body portion, and an outer conductor engager supported within the first body portion and the second body portion, the outer conductor engager having a rearward end portion;

an adapter portion having an adapter body portion, a coupling portion configured to connect the adapter body portion to a device;

a biasing portion configured to be received in the adapter body portion and configured to be coupled with the second body portion of the connector portion;

wherein the biasing portion comprises a plurality of biasing members;

wherein the biasing members are configured to be separated by spaces that are configured to allow the biasing members to elastically deform radially inwardly;

wherein the second body portion comprises an adapter receiving portion configured to receive the biasing members;

wherein the biasing members are configured to exert a biasing force axially against the adapter receiving portion so as to bias the biasing portion toward the rearward end of the second body portion;

wherein the biasing force is configured to resist an external separating force for separating the adapter portion from the connector portion;

wherein the biasing members are configured to exert a radial biasing force outwardly against the second body portion; and wherein the biasing members are configured to provide the axial and radial biasing forces to provide a secure ground connection between the connector portion and the adapter portion and allow a push/pull connection between the connector portion and the adapter portion.

2. The cable connector assembly of claim 1, wherein the cable receiving end comprises a cable receiving opening configured to receive a coaxial cable.

3. The cable connector assembly of claim 1, further comprising an engagement surface on the adapter body portion, the engagement surface being configured to receive a tool for connecting the adapter body portion to the device.

4. The cable connector assembly of claim 1, further comprising a center conductor connector configured to be received in the biasing portion and the adapter body portion, configured to receive a center conductor of a coaxial cable at a forward end of the adapter portion, configured to receive a second conductor from a rearward end of the adapter portion, and configured to electrically connect the center conductor of the coaxial cable and the second conductor.

5. The cable connector assembly of claim 1, wherein the biasing members extend from a forward end of the adapter portion.

6. The cable connector assembly of claim 1, wherein the second body portion comprises an interior surface and a ramp portion that is configured to extend radially inward from the interior surface toward a center axis of the connector portion.

7. The cable connector assembly of claim 6, wherein the adapter receiving portion is configured adjacent to the ramp portion on a rearward side of the ramp portion.

8. The cable connector assembly of claim 7, wherein the adapter receiving portion is located a greater distance from the central axis of the connector portion than is an inward most portion of the ramp portion, and the ramp portion is configured to form a lip portion that extends radially inward relative to the adapter receiving portion.

9. The cable connector assembly of claim 8, wherein each of the biasing members comprises an engagement portion that is an outermost portion of the biasing member.

10. The cable connector assembly of claim 9, wherein the engagement portion is configured to contact the adapter receiving portion and is configured to apply the radial biasing force on the adapter receiving portion.

11. The cable connector assembly of claim 9, wherein the biasing member is configured to contact the ramp portion and is configured to apply the axial biasing force to the ramp portion.

12. The cable connector assembly of claim 1, wherein the biasing members are configured to prevent a direct, line of sight path through the spaces between an outside of the biasing portion to a longitudinal centerline of the biasing portion.

13. A cable connector assembly configured to allow a push/pull connection, the cable connector assembly comprising:

a connector portion comprising a compression portion, a first body portion configured to be coupled to the compression portion;

a second body portion configured to be coupled to the first body portion;

an adapter portion comprising an adapter body portion;

a biasing portion configured to be received in the adapter body portion;

wherein the biasing portion is configured to be coupled to the second body portion;

wherein the biasing portion is configured to elastically deform radially inward;

wherein the second body portion comprises an adapter receiving portion configured to receive the biasing portion;

wherein the biasing portion is configured to exert an axial biasing force against the adapter receiving portion;

wherein the biasing portion is configured to exert a radial biasing force outwardly against the second body portion; and wherein the biasing portion is configured to provide the axial and radial biasing forces to provide a secure ground connection between the connector portion and the adapter portion and allow a push/pull connection between the connector portion and the adapter portion.

14. The cable connector assembly of claim 13, wherein the adapter portion comprises a coupling portion configured to connect the adapter body portion to a device.

15. The cable connector assembly of claim 13, wherein the axial biasing force is configured to bias the biasing portion toward a rearward end of the second body portion.

16. The cable connector assembly of claim 13, wherein the axial biasing force is configured to resist an external separating force, the external separating force being for separating the adapter portion from the connector portion.

17. The cable connector assembly of claim 13, wherein the second body portion comprises an interior surface and a ramp portion that is configured to extend radially inward from the interior surface toward a center axis of the connector portion.

18. The cable connector assembly of claim 17, wherein the adapter receiving portion is configured adjacent to the ramp portion on a rearward side of the ramp portion.

19. The cable connector assembly of claim 18, wherein the biasing portion comprises an engagement portion that is an outermost portion of the biasing portion.

20. The cable connector assembly of claim 19, wherein the engagement portion is configured to contact the adapter receiving portion and is configured to apply the radial biasing force on the adapter receiving portion.

21. The cable connector assembly of claim 19, wherein the biasing portion is configured to contact the ramp portion and is configured to apply the axial biasing force to the ramp portion.

22. The cable connector assembly of claim 13, wherein the biasing portion is configured to prevent a direct, line of sight path through spaces in the biasing portion between an outside of the biasing portion to a longitudinal centerline of the biasing portion.

23. The cable connector assembly of claim 13, wherein the biasing portion comprises a plurality of biasing members, and the biasing members are configured to be separated by spaces that are configured to allow the biasing members to elastically deform radially inward.

24. A cable connector assembly configured to reduce radio-frequency noise received by a center conductor of a cable, the cable connector assembly comprising:

a connector portion comprising a first body portion and a second body portion configured to be coupled to the first body portion;

an adapter portion comprising a biasing portion;

wherein the biasing portion is configured to be coupled to the second body portion;

wherein the biasing portion is configured to elastically deform radially inwardly; and wherein the biasing portion is configured to prevent a direct, line of sight path through a space in the biasing portion from an outside of the biasing portion to a longitudinal centerline of the biasing portion so as to prevent a direct path through the space for radio-frequency signals from outside the connector assembly to a center conductor of a cable connected by the connector assembly so as to reduce radio-frequency noise received by the center conductor.

25. The cable connector assembly of claim 24, wherein the biasing portion comprises a plurality of biasing members configured to exert an axial biasing force axially against the second body portion, and the biasing members are configured to exert an outward radial biasing force against the second body portion.

26. The cable connector assembly of claim 25, wherein the axial and radial biasing forces provide a secure ground connection between the connector portion and the adapter portion and allow a push/pull connection between the connector portion and the adapter portion.

27. The cable connector assembly of claim 25, wherein a first biasing member of the biasing members is configured to have a first shape, a second biasing member of the biasing members is configured to have a second shape, and the first shape and second shape are different shapes.

28. The cable connector assembly of claim 24, wherein the space comprises a plurality of spaces, and at least one of the spaces intersects another of the spaces.

29. The cable connector assembly of claim 24, wherein the space comprises a plurality of spaces, and at least one of the spaces is parallel to another of the spaces.

30. A cable connector assembly configured to allow a push/pull connection, the cable connector assembly comprising:

a connector portion comprising a first body portion and a second body portion configured to be coupled to the first body portion;

an adapter portion comprising a biasing portion;

wherein the second body portion comprises an interior surface and a ramp portion that is configured to extend radially inward from the interior surface toward a center axis of the connector portion;

wherein the biasing portion is configured to be coupled to the second body portion;

wherein the biasing portion is configured to allow the biasing portion to elastically deform radially;

wherein the biasing portion is configured to exert a first biasing force against the second body portion;

wherein the biasing portion is configured to exert a second biasing force against the second body portion; and wherein the biasing portion is configured to provide a secure ground connection between the connector portion and the adapter portion and allow a push/pull connection between the connector portion and the adapter portion.

31. The cable connector assembly of claim 30, wherein the second body portion comprises an adapter receiving portion configured to receive the biasing portion.

32. The cable connector assembly of claim 30, wherein the first biasing force is configured to resist an external separating force, the external separating force being for separating the adapter portion from the connector portion.

33. The cable connector assembly of claim 30, wherein the second body portion comprises an adapter receiving portion configured to receive the biasing portion, and the adapter receiving portion is configured adjacent to the ramp portion on a rearward side of the ramp portion.

34. The cable connector assembly of claim 33, wherein the second biasing force is a radial force, the biasing portion comprises an engagement portion that is an outermost portion of the biasing portion, and the engagement portion is configured to contact the adapter receiving portion and is configured to apply the radial biasing force on the adapter receiving portion.

35. The cable connector assembly of claim 30, wherein the second biasing force is an axial biasing force, and the biasing portion is configured to contact the ramp portion and is configured to apply the axial biasing force to the ramp portion.

36. The cable connector assembly of claim 30, wherein the biasing portion comprises a space, and the biasing portion is configured to prevent a direct, line of sight path through the space between an outside of the biasing portion to a longitudinal centerline of the biasing portion.

37. The cable connector assembly of claim 30, wherein the biasing portion comprises a plurality of biasing members.

38. The cable connector assembly of claim 37, wherein the biasing portion comprises spaces between the biasing members to allow the biasing members to elastically deform radially.

39. The cable connector assembly of claim 30, wherein the biasing portion is configured to allow the biasing portion to elastically deform radially inwardly.

40. The cable connector assembly of claim 30, wherein the biasing portion is configured to exert an axial biasing force axially against the second body portion.

41. The cable connector assembly of claim 40, wherein the biasing portion is configured to exert an outward radial biasing force radially against the second body portion.

* * * * *